(No Model.)
W. SCHMIDT.
PROCESS OF POLISHING SHEETS OF PYROXYLINE MATERIAL.
No. 465,784. Patented Dec. 22, 1891.
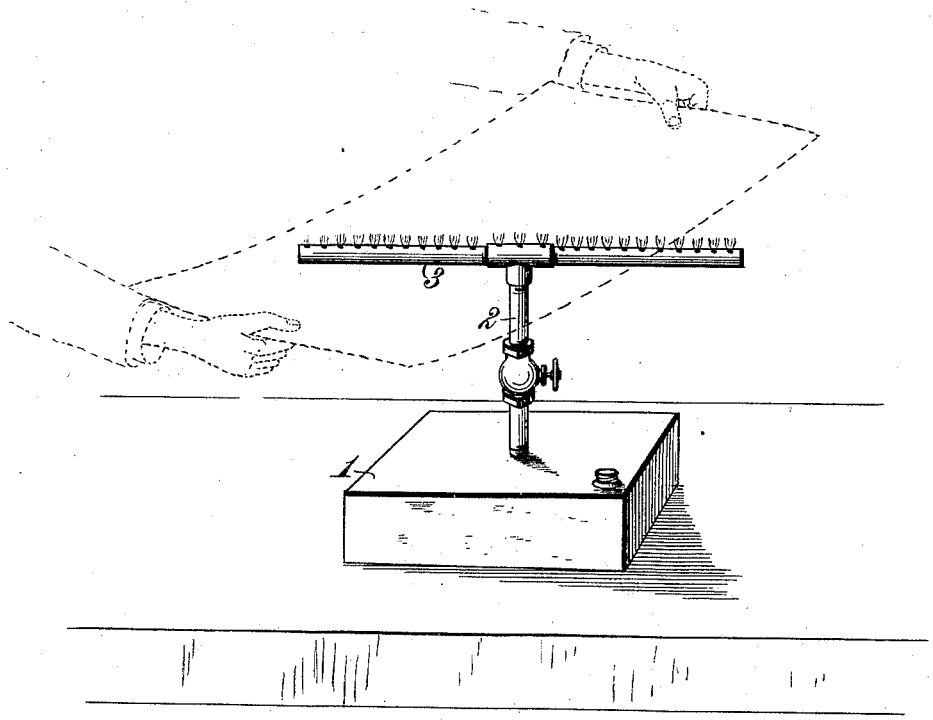

UNITED STATES PATENT OFFICE.

WILLIAM SCHMIDT, OF ARLINGTON, NEW JERSEY, ASSIGNOR TO THE ARLINGTON MANUFACTURING COMPANY, OF SAME PLACE.

PROCESS OF POLISHING SHEETS OF PYROXYLINE MATERIAL.

SPECIFICATION forming part of Letters Patent No. 465,784, dated December 22, 1891.

Application filed May 2, 1891. Serial No. 391,383. (No model.)

*To all whom it may concern:*

Be it known that I, WILLIAM SCHMIDT, a subject of the Emperor of Germany, residing at Arlington, in the county of Hudson and State of New Jersey, have invented new and useful Improvements in the Process of Polishing Sheets of Pyroxyline Material, of which the following is a specification.

This invention relates to the process of polishing sheets of material made from pyroxyline or "pyralin," which latter is a term used by me to designate a compound the same as or similar to celluloid.

Transparent celluloid and pyralin are now used for many purposes, among which I may name the manufacture of indelible pictures, the fronts of blotting-pads, and films for photographic purposes, and for many varieties of portable cameras. When pyralin is made clear and pure, it is as transparent and colorless as window-glass; but when first cut from what is known in the art as a "cake" it has on its surface fine lines which are caused by the serrations in the edge of the cutting-knife, however sharp or well ground it may be. To remove these knife-marks, and at the same time straighten and polish the sheet, it is customary to first place them between highly-polished plates and then introduce the same in a hydraulic press and heat and press the sheet at the same operation, all of which is well known. In this operation the heat employed softens the surface of the pyralin sheet and causes it to flow slightly, and the pressure driving out all air causes the sheet to conform to the highly-polished surface of the plate against which it is pressed, so that when chilled and taken out it is as highly polished as the plate against which it has been pressed. So sensitive to heat are the pyralin sheets that in this operation discoloration is sometimes caused and the sheets are thereby deteriorated in quality. To avoid this the least possible exposure to heat is the object aimed at by the workman; but it frequently occurs that the workman fails to allow sufficient heating and the knife-marks are therefore not entirely removed. To remedy these defects I have discovered that vapor of alcohol applied to the surface of the sheet slightly softens and renders that part so susceptible to pressure that the surface can be polished in the ordinary manner, previously described, with less heat and pressure and in much less time, while I also avoid the discoloration incident to overheating. Furthermore, by this method a high polish is at once imparted to the sheet without any pressure or heat whatever.

Transparent pyralin, as it becomes seasoned, usually appears more or less turbid or semitransparent. It therefore becomes necessary to polish its surface to bring out its transparency. By my method this transparency is at once restored to it, and if necessary to be flattened the sheet can be flattened without the use of heat and with pressure only; but this will not remove the knife-marks, to accomplish which heat is required, but not so high a degree nor of so long a duration as when polished by the old methods. I therefore not only save time in the operation, but entirely avoid the deterioration in quality, which is caused where the greater heat is employed. I also save loss by discoloration and thereby produce a pyroxyline compound of higher grade than has ever yet been produced by other known methods.

It is desirable to use as light a vapor as possible; otherwise the sheet would be brought to a condition almost like that in which it was originally cut, and which is known as "unseasoned." The vapor of alcohol, being highly volatile, quickly passes off and leaves the surface only slightly softened and so that it can be readily manipulated in the subsequent treatment.

In the accompanying drawing the figure is a perspective view of an apparatus suitable for carrying my invention into effect.

In practice I employ a reservoir 1, into which alcohol, either methylic or ethylic, is placed and heated in any ordinary way, and from the reservoir extends a pipe 2, carrying a tube 3, having fine apertures to allow the vaporized alcohol to pass out. The sheet of pyralin is rapidly passed over the tube and the operator can at once see the glazed surface produced and therefore knows by sight when that part of the operation is completed. The reservoir can be heated either by hot water or on a steam-table, or in a sand bath, or otherwise, and therefore I do not confine myself to any particular manner of vaporizing the alcohol, nor to the apparatus here described. Neither do I limit myself to the alcohol to be employed, for while I prefer methylic alcohol, because it vaporizes at a low heat, there are many of the well-known solvents of pyroxyline that will answer just as well.

I have named transparent pyralin or celluloid; but other varieties are favorably acted on just as well and as beneficially, and can be polished with a lesser degree of heat and in much less time; but I have mentioned the transparent varieties because they are the hardest to produce, and the defects in them made the necessity for this invention.

Having thus described my invention, what I claim is—

1. In the art of polishing sheets of pyroxyline materials, the process herein described of softening the surface of a sheet preparatory to pressing the same, which consists in subjecting the sheet to the action of a nascent vapor.

2. In the art of polishing sheets of pyroxyline materials, the process herein described of softening the surface of a sheet preparatory to pressing the same, which consists in subjecting the sheet to the action of vapor of alcohol.

3. The process herein described of polishing sheets of pyroxyline material, which consists in subjecting the sheet to the action of a vaporized solvent of pyroxyline compounds and then pressing the sheet between polished surfaces, substantially as set forth.

4. The process herein described of polishing sheets of pyroxyline material, which consists in subjecting the sheet to the action of vapor of alcohol and then pressing the sheet between polished surfaces, substantially as set forth.

5. The process herein described of polishing sheets of pyroxyline material, which consists in first subjecting the sheet to the action of vapor of a solvent of pyroxyline compounds and then to heat and pressure between polished surfaces, substantially as set forth.

In testimony whereof I have hereunto set my hand and affixed my seal in presence of two subscribing witnesses.

WILLIAM SCHMIDT. [L. S.]

Witnesses:
 JOSEPH R. FRANCE,
 A. B. CARTON.